United States Patent [19]
Georges

[11] 3,868,985
[45] Mar. 4, 1975

[54] PROCESS OF ADHERING POLYESTER TEXTILE MATERIAL TO RUBBER AND THE PRODUCTS PRODUCED THEREBY

[75] Inventor: Louis W. Georges, Akron, Ohio

[73] Assignee: The Firestone Tire & Rubber Company, Akron, Ohio

[22] Filed: Nov. 17, 1972

[21] Appl. No.: 307,755

Related U.S. Application Data
[63] Continuation of Ser. No. 123,011, March 10, 1971, abandoned.

[52] U.S. Cl....... 152/330 R, 117/76 T, 117/138.8 F, 152/359, 156/110 A, 156/308, 156/322, 156/335, 161/231, 161/239, 260/29.3, 260/846
[51] Int. Cl........................... B60c 1/00, B32b 25/10
[58] Field of Search.................... 117/76 T, 138.8 F; 152/357, 359, 330 R; 156/110 A, 308, 322, 335; 161/231, 233, 239; 260/29.3, 845, 846

[56] References Cited
UNITED STATES PATENTS

| | | | |
|---|---|---|---|
| 2,429,397 | 10/1947 | Compton et al. | 161/241 |
| 3,345,206 | 10/1967 | Korpman | 117/122 |
| 3,437,122 | 4/1969 | Van Gils | 152/330 |
| 3,475,362 | 10/1969 | Romanick et al. | 260/25 |
| 3,509,018 | 4/1970 | Leshin et al. | 161/241 |

*Primary Examiner*—Douglas J. Drummond
*Assistant Examiner*—Robert A. Dawson

[57] ABSTRACT

Polyester textile material is treated with a dip mixture containing a carboxy polymer and an incompletely condensed resin formed from a polyhydric phenol and an aldehyde, which mixture has its pH raised to at least 7.5 by addition of a volatile base. The dipped textile material is then coated with a rubber compound which can contain a methylene donor.

9 Claims, No Drawings

PROCESS OF ADHERING POLYESTER TEXTILE MATERIAL TO RUBBER AND THE PRODUCTS PRODUCED THEREBY

This is a continuation of application Ser. No. 123,011, filed Mar. 10, 1971, and now abandoned.

BACKGROUND OF THE INVENTION

This invention relates to improvements in the method of adhering textile materials to rubber, and to the improved laminates so obtained.

In certain rubber articles designed to withstand considerable stresses in use the rubber is reinforced with plies of comparatively inextensible textile materials. Thus, rubber hose, belts and tires are commonly reinforced with filamentary textiles in the form of yarns, cords or fabric. In such articles, it is important that the plies of textile reinforcing material be firmly adhered to the rubber intermediate the textile plies and remain effectively adhered even after the article has been subjected to repeated varying strains in use, because any separation and relative movement of the rubber and textile parts leads to abrasion between these parts and consequent failure.

In order to improve the adhesion of the textile material to the rubber intermediate the textile plies, it is common practice to first apply a deposit of rubber on the textile material, such as a tire cord fabric, by passing the textile material through a bath of an aqueous dispersion of rubber, such as rubber latex composition, as in a so-called "dipping" treatment, and drying. The rubber latex dip composition preferably contains a resin, e.g. a fusible partially reacted resorcinol-formaldehyde resin, such as a condensate of one mole of resorcinol with substantially 2.0 to 3.0 moles of formaldehyde, which on subsequent heating as during drying of the treated textile material cures the fusible resin to an infusible state. A layer of rubber compound is then applied to the treated textile material, usually by calendering.

With the introduction of polyester cord materials, different problems arise from those encountered with rayon or nylon. Accordingly, modifications of the standard adhesive systems and methods are required to produce the required adhesion.

It has been found, for example, that the presence of fixed alkali at the surface of polyester textile materials has a harmful effect. Either by hydrolysis or saponification, or both, the polyester is chemically degraded, and the adhesive bond fails at this interface.

SUMMARY OF THE INVENTION

It has now been found that improved adhesion between a polyester textile material and a rubber compound can be obtained by treating the polyester textile material with a dip mixture containing a resin and a carboxy latex, the pH of which dip mixture has been raised with a volatile base to at least a value of 7.5. The dip treatment is followed by a standard heat-drying step and a coating step to apply the rubber compound to the treated polyester textile material. The coated material is then assembled in a known manner into a finished article, such as a pneumatic tire, and the article is vulcanized.

By using a volatile base, such as ammonia, to raise the pH of the dip mixture, the stability of the dip mixture is assured without using the harmful fixed alkali materials which would degrade the polyester textile material. On heat-drying, sufficient volatile base is driven off to leave the dried dip mixture in the acid state.

In addition to the improvements in adhesion and fiber strength, other beneficial results are realized by the process of the invention. Drying temperatures lower than those in the conventional processes result in better fabric tensile and fatigue life. Also, the carboxy latex employed in the invention is considerably cheaper than conventional vinyl pyridine latices. The dip mixture does not require an aging step before use. Finally, the dip-treated textile material shows no tendency to flake off, as seen with some conventional systems.

DESCRIPTION OF THE PREFERRED EMBODIMENTS

The textile material employed in the invention should be a polyester material, wither monofilament or stranded, in a fabric which is usually in the form of parallel cords. Optionally, however, a woven fabric can be used, or short fibers, either randomly dispersed, or oriented in a particular direction. The use of the invention has little positive value with other commonly used textile materials such as glass, rayon or nylon, and can be even harmful in the case of nylon.

The dip treating step can be performed in a conventional manner, as by dip coating a continuous length of fabric and heat-drying. Tensioning can be performed as a part of this step to impart dimensional integrity to the fabric. If short, discrete fibers are employed, they can be treated in any convenient manner.

The carboxy latex component of the dip mixture is a copolymer prepared from a monomer mixture of at least 50% of a conjugated diene monomer of from 4 to 8 carbon atoms, and a polymerizable carboxy acid. Such copolymers are well known in the art, and are normally prepared in the latex form by emulsion polymerization. The preferred conjugated diene monomers are butadiene-1,3 and isoprene, but other conjugated dienes of from 4 to 8 carbon atoms can be advantageously used. The use of at least 50% of the conjugated diene monomer produces a rubber polymer which is normally essentially insoluble in water.

The polymerizable acids which can be used are unsaturated mono-or poly-carboxy acids such as, for example, acrylic, methacrylic, crotonic, cinnamic, maleic, fumaric, itaconic or muconic acids. Other polymerizable carboxy acids can also be used, but the foregoing represent the most widely commercially used materials.

A monovinyl aromatic co-monomer can optionally also be included in the polymer, such as styrene, alpha-methyl styrene and the like; many commercial copolymers are available which contain a third monomer of this type. One such copolymer is formed from butadiene, styrene and acrylic acid.

When carboxy acids are polymerized in emulsion systems the presence of the acid monomer will give a system pH which is less than 7, commonly as low as 2 to 3. Normal practice is to raise the pH of the finished latex to 7 or above, so that the latex can be handled in contact with metal surfaces without the risk of corroding the surfaces and/or contaminating the latex.

While some latices are adjusted with fixed alkali materials, such as sodium hydroxide, it is important to the invention that the pH adjustment be made with a volatile base, such as ammonia. Instead of ammonia (which is preferred) other volatile bases, such as amines, can be used. The latex pH can be adjusted before its combination with the resin, or the dip mixture can be adjusted after the latex and resin have been mixed together. In any case it is important that fixed alkali materials be excluded to the extent that removal of the volatile base will leave the pH of the dip mixture at 7 or below.

The resin component of the dip mixture is a water solution of an incompletely condensed resin formed by the reaction of a polyhydric phenol with an aldehyde of from 1 to 7 carbon atoms. Resins of this type are common in the art; the preferred material being the reaction product of resorcinol and formaldehyde. The resin can be produced by reacting, for example, one equivalent of the polyhydric phenol with from 0.25 to 0.75 equivalents of the aldehyde. Since the condensation is incomplete, the resin remains water-soluble for ease of handling, and capable of further reaction.

The preferred polyhydric phenol is resorcinol, as stated above, and formaldehyde, acetaldehyde, propionaldehyde, benzaldehyde, furfural, or other aldehydes of from 1-7 carbon atoms can be employed to produce the resin.

The proportions of the resin to the carboxy latex are not critical to the operation of the invention, but a ratio of from one-half to two parts of resin by weight per part of the carboxy latex (on a solids basis) is preferred. In the final dip mixture the total solids content is selected based on the desired pick-up of material, and will range from about 10% to about 30% preferably about 20% by weight. In the conventional dipping processes, such concentrations will result in a pick-up of from 1 to 15 per cent of compound solids based on the weight of the textile material.

It is preferred to combine the latex and resin solution when both are at a pH of 7 or below. The incompletely condensed resin solution will have an initial pH below 7 because of the excess of unreacted polyhydric phenol, and instability problems can be avoided if the carboxy latex is also at a low pH when the resin and latex are combined. Alternatively, both materials can be adjusted to a pH above 7 before they are combined.

The final pH of the dip mixture should be in excess of 7.5. A preferred pH range is from 8.0 to 10.0, although values higher than 10.0 will not usually be harmful since the excess base will be largely volatilized during the drying step.

Drying of the dipped textile material is normally done in a continuous hot-air oven. Times and temperatures for drying are not critical except that essentially all the water and excess volatile base should be removed in this step.

The rubber compound with which the textile material is coated can be compounded natural rubber, synthetic rubber, or a blend of the two. By synthetic rubber is meant any of a number of elastomeric polymers, such as homopolymers from conjugated diene monomers, or copolymers of one or more conjugated dienes with styrene, vinyl pyridine, vinyl toluene, methyl methacrylate or acrylonitrile. Also included are such elastomers as neoprene, butyl, and ethylene-propylene copolymers with a non-conjugated diene monomer (EPDM). The elastomer used is selected for its compatibility with surrounding rubber components, if any, as in the case of a pneumatic tire. Preferred rubber compounds are based on natural rubber, styrene-butadiene copolymers, and blends of the two. The rubber is preferably compounded with vulcanizing ingredients, antioxidants and reinforcing pigments, such as carbon black.

Improved adhesion can be obtained by incorporating a methylene donor in the rubber compound. Hydroxymethyl melamine is the preferred material for this purpose. Alternate materials include paraformaldehyde, hexamethyl methoxy melamine, and others. Hexamethylene tetramine is not recommended as a methylene donor, since on heating it tends to produce ammonia, which has a harmful effect on polyester cord. Reaction of the methylene donor material in the rubber compound with the unreacted phenolic content of the dip mixture is believed to improve the adhesion. The methylene donor material apparently reacts on heating to release formaldehyde and allow complete condensation of the resin on the surface of the fibers. If the methylene donor is present in the rubber compound the further reaction of the resin produces an enhanced adhesive bond at the fiber surface.

Another advantage realized by using an incompletely condensed "formaldehyde-starved" resin has also been noted. In the skim-coating of the cord fabric, some areas of the cords are not covered by rubber compound. If the resin used for cord treatment is completely condensed, these areas of the cord can become stiff. If, however, the resin used is "formaldehyde-starved", only those areas of the cord in contact with the rubber compound will have completely condensed resin on their surfaces. The areas not in contact with the rubber compound will thus remain flexible.

In addition to tires, belts, and hose, other articles can be produced using the techniques of the invention.

For a more complete understanding of the invention, the following examples are presented to show specific uses of the techniques taught. Unless otherwise indicated all percentages are by weight.

EXAMPLE I

A Novolak resin was prepared in which the molar ratio of resorcinol to formaldehyde was 1 to 0.67. The solids content was adjusted with water to 20%, and the pH of the solution was adjusted to 9.0 with concentrated aqueous ammonia.

A latex prepared from a monomer mixture of 68.5 per cent butadiene-1,3, 28.5 per cent styrene and 3.0 per cent acrylic acid had its solids content also adjusted to 20% with water. Using different ratios of resin to latex, Dacron cord was dipped and dried at various temperatures.

Using the various cord samples adhesion pads were prepared from rubber with and without methylene donors. The rubber compounds contained 50% natural and 50% SBR rubber, and were compounded with a conventional curing system, oil, carbon black, and an antioxidant.

T-adhesion (pullout adhesion) tests were performed at 110° C. on ¼ in. specimens and the results were reported as pounds per inch required to pull the cords out of the rubber. These tests are a variation of the "H-Adhesion" test, as described in volume 114 of INDIA RUBBER WORLD (1946) at pp. 213–217.
The results are summarized in the following table:

Dip A had a final pH of 8.7, Dip B, a final pH of 8.5. Both dips had a total solids content of 20% and a rubber/resin ratio (based on solids content) of 1.4/1.

| Trial | Latex to Resin Ratio | Drying Temp., °C. | T-Adhesion, Lb/in (1) | (2) | (3) | Breaking Load (lb) | CIR[4] % STR RET. | SCEF[5] (Min) |
|---|---|---|---|---|---|---|---|---|
| 1 | 1.4/1 | 232 | 37 | 54 | — | — | 73 | — |
| 2 | 1/1 | 232 | 36 | 55 | — | — | 74 | — |
| 3 | 1.4/1 | 240 | 38 | 50 | — | — | 71 | — |
| 4 | 1/1 | 240 | 37 | 56 | — | — | 79 | — |
| 5 | 1.4/1 | 204 | 26 | 50 | — | — | 72 | — |
| 6 | 1.4/1 | 218 | 30 | 54 | — | — | 68 | — |
| 7 | 1.4/1 | 232 | 38 | 55 | — | — | 67 | — |
| 8 | 1.4/1 | 221 | 24 | 44 | 49 | 65.2 | — | 209 |
| 9 | 1.4/1 | 232 | 26 | 52 | 54 | 61.8 | — | 238 |

[1] No methylene donor
[2] 2.5 parts paraformaldehyde in rubber compound
[3] 2.5 parts hydroxymethyl melamine in rubber compound
[4] "Cured in Rubber" Heat Aging Test. Cords are cured in rubber pads. The cords are removed and tested for breaking strength. The value reported is the percentage of strength retained by cords aged for 24 hours at 177°C., as compared with unaged cords.
[5] "Shear, Compression, Elongation, Flex" test as reported in an article by M. J. Forster and I. B. Prettyman, Rubber Chem. & Tech. Vol. 42, No. 4 (September, 1969).

In order to compare the effect of a dip mixture treated with a fixed-alkali base with one treated with a volatile base the following examples were performed.

EXAMPLE II

An incompletely condensed resorcinol-formaldehyde resin solution was prepared in the following manner:

To 48.0 grams of water were added 275.0 grams of resorcinol. The mixture was heated to approximately 93°C. to dissolve the resorcinol in the water. To the resultant solution was added 136.6 grams of a 37% solution of formaldehyde in water. The addition was made in dropwise fashion over a 60 minute period, with agitation, and the temperature was maintained at 92° – 95° C.

40.0 grams of a 50% solution of oxalic acid in water were added gradually, and the mixture was stirred for 90 minutes, maintaining the temperature at 92°–95°C. Enough water was then added to bring the total weight of the resin solution to 1200 gm, and the mixture was cooled to 25° C.

The resulting resin was calculated to contain 0.335 equivalents of formaldehyde per equivalent of resorcinol, making it "formaldehyde-starved".

EXAMPLE III

The resin solution produced in Example II was divided into two 600 gram portions. One portion was adjusted to a pH of 9.0 with NH4OH, and diluted with water to a total solids content of 20%. The other portion was adjusted to a pH of 9.0 with NaOH, and also diluted with water to 20% total solids content. These portions will be referred to as resin solutions A and B, respectively.

EXAMPLE IV

Two dip mixtures were produced according to the following recipes:

|  | Dip A | Dip B |
|---|---|---|
| *Carboxy latex (20% solids) | 186.0 gm | 186.0 gm |
| Resin solution A | 267.5 gm | — |
| Resin solution B | — | 267.5 gm |
| Water | 188.5 gm | 188.5 gm |
| Total | 642.0 gm | 642.0 gm |

*An emulsion copolymer having a monomer ratio of Butadiene/Styrene/Acrylic acid = 68.5/28.5/3, and a pH of 3.5

EXAMPLE V

Samples of Dacron polyester tire cord were treated with the two dips produced in Example IV, at a speed of 18.3 meters per minute. Treating conditions were as follows:

|  | % Stretch | Time, sec. | Temp., °C. |
|---|---|---|---|
| First zone | 4 | 155 | 177 |
| Second zone | 2 | 45 | 232 |
| Third zone | –3 | 36 | 232 |

Properties of the treated cords were measured, and are compared:

|  | A | B |
|---|---|---|
| Denier of treated cord | 4672 | 4715 |
| % Elongation at 9.07 kg | 4.9 | 5.1 |
| % Elongation at break | 15.6 | 15.5 |
| Break load, kg | 28.2 | 27.3 |
| Tenacity (gm/denier) | 6.02 | 5.79 |
| C.I.R. Heat Aging; % Strength retained | 77.2 | 76.1 |
| T-Adhesion at 110°C., lb/in | 43.4 | 22.4 |

It can be seen that the use of a volatile base for pH adjustment rather than a fixed alkali base gave cords having superior strength and adhesion, while retaining equal heat aging.

I claim:
1. The process of producing an article by bonding a polyester textile material to a rubber compound comprising the successive steps of
   combining (a) a latex of a copolymer prepared from a monomer mixture of at least 50% of a conjugated diene of from 4 to 8 carbon atoms and a polymerizable carboxy acid with (b) a water solution of an incompletely condensed resin which is a reaction product of a polyhydric phenol and an aldehyde of from 1 to 7 carbon atoms to form a dip mixture having a pH below 7,
   treating the dip mixture with a volatile base to raise its pH to at least 7.5,
   dipping the textile material in the dip mixture,
   heating and drying the dipped textile material,
   coating the textile material with an unvulcanized rubber compound,
   and assembling and vulcanizing the coated textile material to form the finished article.

2. The process of claim 1, wherein the monomer mixture also contains sytrene.

3. The process of claim 1, wherein the polyhydric phenol is resorcinol and the aldehyde is formaldehyde.

4. The process of claim 1, wherein the volatile base is ammonia.

5. The process of claim 1, wherein the rubber compound contains a methylene donor.

6. The process of claim 5, wherein the methylene donor is hydroxymethyl melamine.

7. In a composite article of rubber and polyester cord, such as a pneumatic tire, wherein the cord has been dipped in a mixture of a copolymer latex and a resin which resin is a reaction product of a polyhydric phenol and an aldehyde of from 1 to 7 carbon atoms, the dipped cord has been heated, dried and coated with a rubber compound, assembled with other rubber components and vulcanized, the improvement wherein the latex contains a copolymer prepared from a monomer mixture of at least 50% of a conjugated diene of from 4 to 8 carbon atoms and a polymerizable carboxy acid, and the mixture of latex and resin has been adjusted from a pH of below 7 to a pH of at least 7.5 by addition of a volatile base to said mixture.

8. The article of claim 7, wherein the rubber compound contains a methylene donor.

9. The article of claim 7, which is a pneumatic tire.

* * * * *